United States Patent
Lee et al.

(10) Patent No.: US 11,915,005 B1
(45) Date of Patent: Feb. 27, 2024

(54) BRANCH PREDICTOR TRIGGERING

(71) Applicant: Arm Limited, Cambridge (GB)

(72) Inventors: Chang Joo Lee, Austin, TX (US);
Michael Brian Schinzler, Round Rock, TX (US); Yasuo Ishii, Austin, TX (US);
Sergio Schuler, Austin, TX (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/960,390

(22) Filed: Oct. 5, 2022

(51) Int. Cl.
*G06F 9/38* (2018.01)

(52) U.S. Cl.
CPC .................................. *G06F 9/3844* (2013.01)

(58) Field of Classification Search
None
See application file for complete search history.

(56) References Cited

U.S. PATENT DOCUMENTS

| | | | | |
|---|---|---|---|---|
| 2002/0078331 A1* | 6/2002 | Ju | ........................ | G06F 9/3844 712/240 |
| 2017/0090935 A1* | 3/2017 | Falsafi | ................ | G06F 12/0875 |
| 2019/0361707 A1* | 11/2019 | Vougioukas | .......... | G06F 9/3806 |
| 2020/0110611 A1* | 4/2020 | Ishii | ...................... | G06F 9/3806 |
| 2020/0150966 A1* | 5/2020 | Agrawal | ............... | G06F 9/3804 |
| 2021/0311744 A1* | 10/2021 | Gong | .................... | G06F 9/3804 |
| 2023/0305850 A1* | 9/2023 | Prasky | .................. | G06F 9/3867 712/240 |

OTHER PUBLICATIONS

Seznec, A. et al., Multiple-Block Ahead Predictors, 1996, ACM, pp. 116-127. (Year: 1996).*

* cited by examiner

*Primary Examiner* — Eric Coleman
(74) *Attorney, Agent, or Firm* — NIXON & VANDERHYE P.C.

(57) ABSTRACT

A data processing apparatus includes receive circuitry that receives an indication of a trigger block of instructions. Branch prediction circuitry provides, in response to the trigger block of instructions, branch predictions in respect of a branch within: a subsequent block of instructions subsequent to the trigger block of instructions in execution order, when in a 1-taken mode of operation and a later block of instructions subsequent to the subsequent block of instructions in execution order, when in a 2-taken mode of operation

17 Claims, 7 Drawing Sheets

BRANCH PREDICTOR TRIGGERING

TECHNICAL FIELD

The present disclosure relates to data processing and particularly branch prediction.

DESCRIPTION

As branch predictors become larger, they may inevitably become slower. This will require some amount of creativity to obtain predictions for blocks of instructions before they are actually needed. This problem can be further complicated when branch prediction is performed for multiple blocks at the same time.

SUMMARY

Viewed from a first example configuration, there is provided a data processing apparatus comprising: receive circuitry configured to receive an indication of a trigger block of instructions; and branch prediction circuitry configured to provide, in response to the trigger block of instructions, branch predictions in respect of a branch within: a subsequent block of instructions subsequent to the trigger block of instructions in execution order, when in a 1-taken mode of operation; and a later block of instructions subsequent to the subsequent block of instructions in execution order, when in a 2-taken mode of operation.

Viewed from a second example configuration, there is provided a data processing method comprising: receiving an indication of a trigger block of instructions; and providing, in response to the trigger block of instructions, branch predictions in respect of a branch within: a subsequent block of instructions subsequent to the trigger block of instructions in execution order, when in a 1-taken mode of operation; and a later block of instructions subsequent to the subsequent block of instructions in execution order, when in a 2-taken mode of operation.

Viewed from a third example configuration, there is provided a non-transitory computer-readable medium to store computer-readable code for fabrication of a data processing apparatus comprising: receive circuitry configured to receive an indication of a trigger block of instructions; and branch prediction circuitry configured to provide, in response to the trigger block of instructions, branch predictions in respect of a branch within: a subsequent block of instructions subsequent to the trigger block of instructions in execution order, when in a 1-taken mode of operation; and a later block of instructions subsequent to the subsequent block of instructions in execution order, when in a 2-taken mode of operation.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Figure 1:
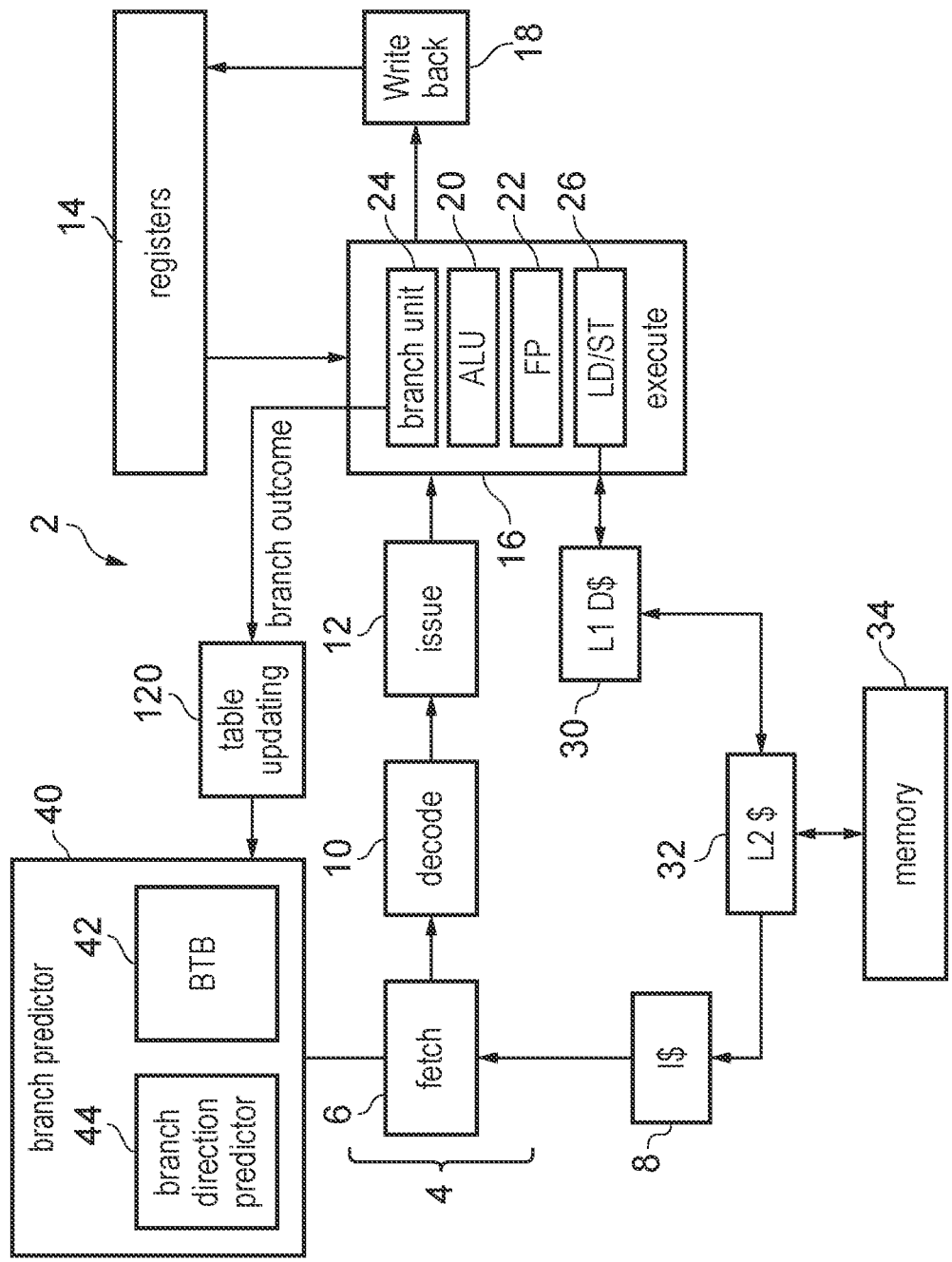
FIG. 1 illustrates an apparatus.

Before discussing the embodiments with reference to the accompanying figures, the following description of embodiments is provided.

In accordance with one example configuration there is provided a data processing apparatus comprising: receive circuitry configured to receive an indication of a trigger block of instructions; and branch prediction circuitry configured to provide, in response to the trigger block of instructions, branch predictions in respect of a branch within: a subsequent block of instructions subsequent to the trigger block of instructions in execution order, when in a 1-taken mode of operation; and a later block of instructions subsequent to the subsequent block of instructions in execution order, when in a 2-taken mode of operation.

Instructions may be fetched and provided to the branch prediction circuitry in blocks. The branch predictor may provide a prediction of whether a branch in the block of instructions is taken or not. Due to the complexity of the branch prediction circuitry (e.g. its large size), a trigger block is used to trigger the prediction for other blocks of instructions such as the subsequent block or the later block. That is, when a notification of the trigger block is received, a prediction for the subsequent block or the later block is initiated. In some situations, the branch prediction circuitry may consider multiple (e.g. two) blocks of instructions simultaneously.

In some examples, the branch prediction circuitry is a global-history based branch predictor; and the branch prediction circuitry is configured to return a prediction for a given block of instructions more than one processor cycle after receiving a request for the prediction. A global-history based branch predictor considers the history (outcome) of branch instructions from previously executed blocks of instructions. Such branch predictors work on the premise that the sequence of control flow instructions (e.g. branch instructions) used to reach a particular point in the program is indicative of how a next branch instruction will execute (whether it will be taken or not). Since global-history based branch predictors work by considering, for each branch instruction, the global-history over a period of time, the amount of data to be stored can be particularly large. Furthermore, as the number of branch predictions, and the amount of history considered increases, the amount of required data increases (and potentially the accuracy of the predictions increases). However, as the amount of data to be stored increases, the speed of the branch prediction circuitry drops. In these examples, the branch prediction circuitry requires more than one processor cycle and so cannot be activated for a branch instruction (or a block of instructions) on the same processor cycle that a prediction for that branch instruction (or block of instructions) is desired. Instead, the prediction may be produced in a later processor cycle such as part-way through the next processor cycle.

In some examples, the branch prediction circuitry is a TAGE predictor. A Tagged Geometric (TAGE) predictor is a particular type of global-history based branch predictor. Another example of a global-history based branch predictor is perceptron.

In some examples, the branch prediction circuitry is configured to return a prediction for a given block of instructions based on a branch history of a number of contiguous blocks of instructions prior to the given block of instructions. The branch instructions considered by the global-history based branch predictor may be in blocks of instructions that are contiguous prior to the block for which the prediction is currently being produced. So if the program being executed contains (in order) blocks of instructions A, B, C, D, and E then the prediction for block E may be based on the history of branches in blocks A and B, or blocks A, B, and C, or blocks A, B, C, and D. Each of the blocks whose history is used is contiguous to at least one other block whose history is used, where the blocks are contiguous in execution (rather than program) order. In some examples, only blocks that have (or are predicted to have) taken branches in them are considered, and the contiguity is in respect of blocks having predicted taken instructions.

In some examples, the branch prediction circuitry is configured to return a prediction for a given block of instructions based on a branch history of a number of contiguous blocks of instructions prior to the trigger block of instructions. In these examples, the history of the trigger instruction itself may not be considered due to the size/complexity of the branch prediction circuitry. That is, neither a prediction for the trigger block nor an actual outcome of the trigger block may be available at a time a prediction for the subsequent block of instructions is being produced. In these examples, the blocks whose history is used are previous (and may be immediately previous) to the trigger block.

In some examples, the branch prediction circuitry is configured to return a prediction for a given block of instructions based on a branch history of a number of contiguous blocks of instructions prior to the trigger block of instructions as well as a program counter value associated with the trigger block of instructions. As well as considering the outcomes (or predicted outcomes) of the previous blocks of instructions, a program counter value representing the trigger block can also be considered. This represents the fact that although a (predicted) outcome of the trigger block is not yet known, the fact that execution has arrived from the trigger block is known and this can therefore be factored into the prediction.

In some examples, the data processing apparatus comprises: track circuitry configured to track, for each predicted block of instructions for which a prediction is produced by the branch prediction circuitry, whether the prediction was produced in the 1-taken mode of operation or the 2-taken mode of operation. Since the prediction circuitry has the capability of considering multiple blocks in one processor cycle—but might not always do so—track circuitry can be used to determine which mode of operation was used to produce the prediction. The track circuitry could take the form of a single bit field that is used to track, for each prediction made for each block of instructions, whether the prediction was made in the 1-taken mode of operation or not. This can obviously be represented in a number of ways. For instance, in some examples, a '1' might indicate that the block was predicted in the 2-taken mode of operation whereas a '1' might indicate that the block was predicted in the 1-taken mode of operation. The reverse representation might also be used.

In some examples, the data processing apparatus comprises: track circuitry configured to track, for each predicted block of instructions for which a prediction is produced by the branch prediction circuitry, which of the modes of operation the prediction was produced in, wherein the modes of operation include the 1-taken mode of operation and the 2-taken mode of operation. In these examples, the track circuitry is able to not only represent whether a prediction for the block of instructions was produced in the 1-taken mode and the 2-taken mode but also whether the circuitry was in another mode of operation.

In some examples, the data processing apparatus comprises: pointer storage configured to store a pointer to one of a plurality of entries of global history storage circuitry to indicate a history to be used in a next prediction, wherein each of the entries relate to outcomes of a plurality of blocks of instructions; and misprediction recovery circuitry configured, in response to a misprediction of the subsequent block of instructions or the later block of instructions, to update the pointer. A misprediction occurs when the predicted outcome for a block of instruction differs from the actual outcome (determined when the branch instruction in that block is actually executed). When the misprediction occurs, it is important for the actual outcome to be recorded, but also for any global history to be correctly recorded. In these examples, the global history storage circuitry stores a number of entries, with each subsequent entry storing data (e.g. a branch instruction target and branch instruction address) relating to the taken branch in one block of instructions. In some examples, the history might consider "taken-only" branch history. For instance, the history might track the most recent N taken branches of branch taken information (branch PC, branch target, and/or branch type for instance). So, for instance, if N was four then this might track details regarding the four most recent taken branches (A', B', C', D'. The data for those branches may be combined via hashing. A pointer is used to point to the most recent entry. The pointer may be incremented each time a branch instruction is encountered.

In some examples, in response to a misprediction of the subsequent block of instructions when the subsequent block of instructions is taken, the misprediction recovery circuitry adjusts the pointer to point to one of the entries of the global history storage circuitry corresponding to the subsequent block of instructions; and in response to a misprediction of the later block of instructions when the subsequent block of instructions is taken, the misprediction recovery circuitry adjusts the pointer to point to one of the entries of the global history storage circuitry corresponding to the later block of instructions. In these examples, the pointer is updated to point to one of the entries of the global history storage circuitry that includes the outcome of the subsequent block of instructions as the most recent entry. This is because, as a consequence of the subsequent block of instructions being taken, that fact is taken into account for future branch predictions that follow the subsequent block of instructions. The same situation applies to the later block of instructions—since the fact that the later block of instructions was taken is now known—it is desirable for this fact to be taken into account when making predictions for other blocks of instructions.

In some examples, in response to a misprediction of the subsequent block of instructions when the subsequent block of instructions is not taken, the misprediction recovery circuitry adjusts the pointer to point to one of the entries of the global history storage circuitry corresponding to the trigger block of instructions. Where the misprediction occurs in the subsequent block of instructions, and where the subsequent block of instructions is now known not to be taken, the future behaviour of the subsequent block of instructions is that it is likely to be considered alongside the later block of instructions. In that case, the pointer should be updated to point to one of the entries of the global history storage circuitry that relates to the trigger, since it is this block (in the future) that is likely to trigger a prediction for the subsequent block of instructions.

In some examples, in response to a misprediction of the subsequent block of instructions when the subsequent block of instructions is not taken, the misprediction recovery circuitry adjusts the pointer to point to one of the entries of the global history storage circuitry corresponding to the trigger block of instructions. That is, the pointer will be moved back to a point having the first instance of an outcome of the trigger block. This is because it is the trigger block that will cause a prediction to be made for the subsequent block of instructions and so the amended history should reflect this.

In some examples, in response to a misprediction of the later block of instructions when the later block of instructions is not taken, the misprediction recover circuitry adjusts the pointer to point to one of the entries to the global history storage circuitry corresponding to the trigger block of instructions. That is, the pointer will be moved back to a point having the first instance of an outcome of the trigger block. This is because it is the trigger block that will cause a prediction to be made for the later block of instructions and so the amended history should reflect this.

In some examples, the data processing apparatus comprises: branch predictor update circuitry configured, in response to a misprediction of the subsequent block of instructions, to store an outcome of the subsequent block of instructions in association with the trigger block of instructions. The branch predictor update circuitry is used to store previous correlations between the global history and whether a branch was taken or not. Under normal circumstances, this might initially store the prediction of whether the branch was taken or not but clearly if the prediction turns out to be incorrect then it is necessary to update what is stored so that future predictions can be made more accurately. Note that the data is stored in association with the trigger block of instructions. This is because in these examples, the prediction for one block is begun early and is therefore triggered by the (preceding) trigger block rather than the block for which a prediction is being made.

In some examples, the data processing apparatus comprises: branch predictor update circuitry configured, in response to a misprediction of the later block of instructions, to store an outcome of the later block of instructions in association with the trigger block of instructions. In these examples, the later block of instructions is predicted in the 2-taken mode of operation. Consequently, if a misprediction occurs in respect of the later block of instructions then the data that is correlated with the trigger block of instructions should be updated so that future predictions that are triggered by the trigger block will take into account the actual outcome of the later block of instructions.

In some examples, the data processing apparatus comprises: hash storage circuitry configured to store, for at least some of the entries, a hash based on the outcomes of a plurality of blocks of instructions. Typically, the data relating to a number of previous branch instructions may be combined to make predictions. That is, predictions may not be predicated on simply one recent branch instruction but rather several. This combining can be achieved by using hashing. In these examples, a number of hashes are stored—e.g. for several sets of entries. This way, if and when the pointer is updated, the hash is already known without requiring recalculation, which could slow down the process of adjusting for misprediction. In some examples, where the prediction circuitry is able to perform N-taken (considering N blocks of instructions and producing a single prediction for the last of those N blocks), N+1 registers may be provided to provide previous global history register hash values and inhibit the need to reperform the hashing process.

Particular embodiments will now be described with reference to the figures.

FIG. 1 schematically illustrates an example of a data processing apparatus 2. The data processing apparatus has a processing pipeline 4 which includes a number of pipeline stages. In this example, the pipeline stages include a fetch stage 6 for fetching instructions from an instruction cache 8; a decode stage 10 for decoding the fetched program instructions to generate micro-operations to be processed by remaining stages of the pipeline; an issue stage 12 for checking whether operands required for the micro-operations are available in a register file 14 and issuing micro-operations for execution once the required operands for a given micro-operation are available; an execute stage 16 for executing data processing operations corresponding to the micro-operations, by processing operands read from the register file 14 to generate result values; and a writeback stage 18 for writing the results of the processing back to the register file 14. It will be appreciated that this is merely one example of possible pipeline architecture, and other systems may have additional stages or a different configuration of stages. For example in an out-of-order processor a register renaming stage could be included for mapping architectural registers specified by program instructions or micro-operations to physical register specifiers identifying physical registers in the register file 14. Furthermore, some of these pipeline stages may actually encompass several pipeline stages.

The execute stage 16 includes a number of processing units, for executing different classes of processing operation. For example the execution units may include a scalar arithmetic/logic unit (ALU) 20 for performing arithmetic or logical operations on scalar operands read from the registers 14; a floating point unit 22 for performing operations on floating-point values; a branch unit 24 for evaluating the outcome of branch operations and adjusting the program counter which represents the current point of execution accordingly; and a load/store unit 28 for performing load/store operations to access data in a memory system 8, 30, 32, 34.

In this example, the memory system includes a level one data cache 30, the level one instruction cache 8, a shared level two cache 32 and main system memory 34. It will be appreciated that this is just one example of a possible memory hierarchy and other arrangements of caches can be provided. The specific types of processing unit 20 to 26 shown in the execute stage 16 are just one example, and other implementations may have a different set of processing units or could include multiple instances of the same type of processing unit so that multiple micro-operations of the same type can be handled in parallel. It will be appreciated that FIG. 1 is merely a simplified representation of some components of a possible processor pipeline architecture, and the processor may include many other elements not illustrated for conciseness.

As shown in FIG. 1, the apparatus 2 includes a branch predictor 40 for making predictions regarding branch instructions. The branch predictor 40 is looked up based on addresses of instructions (or blocks of instructions) provided by the fetch stage 6 and provides a prediction on whether those instructions are predicted to include branch instructions, and for any predicted branch instructions, a prediction of their branch properties such as a branch type, branch target address and branch direction (predicted branch outcome, indicating whether the branch is predicted to be taken or not taken). The branch predictor 40 includes a branch target buffer (BTB) 42 for predicting properties of the branches other than branch direction, and a branch direction predictor (BDP) 44 for predicting the not taken/taken outcome (branch direction). It will be appreciated that the branch predictor could also include other prediction structures such as a call-return stack for predicting return addresses of function calls, a loop direction predictor for predicting when a loop controlling instruction will terminate a loop, or other more specialised types of branch prediction structures for predicting behaviour of outcomes in specific scenarios.

Figure 2:
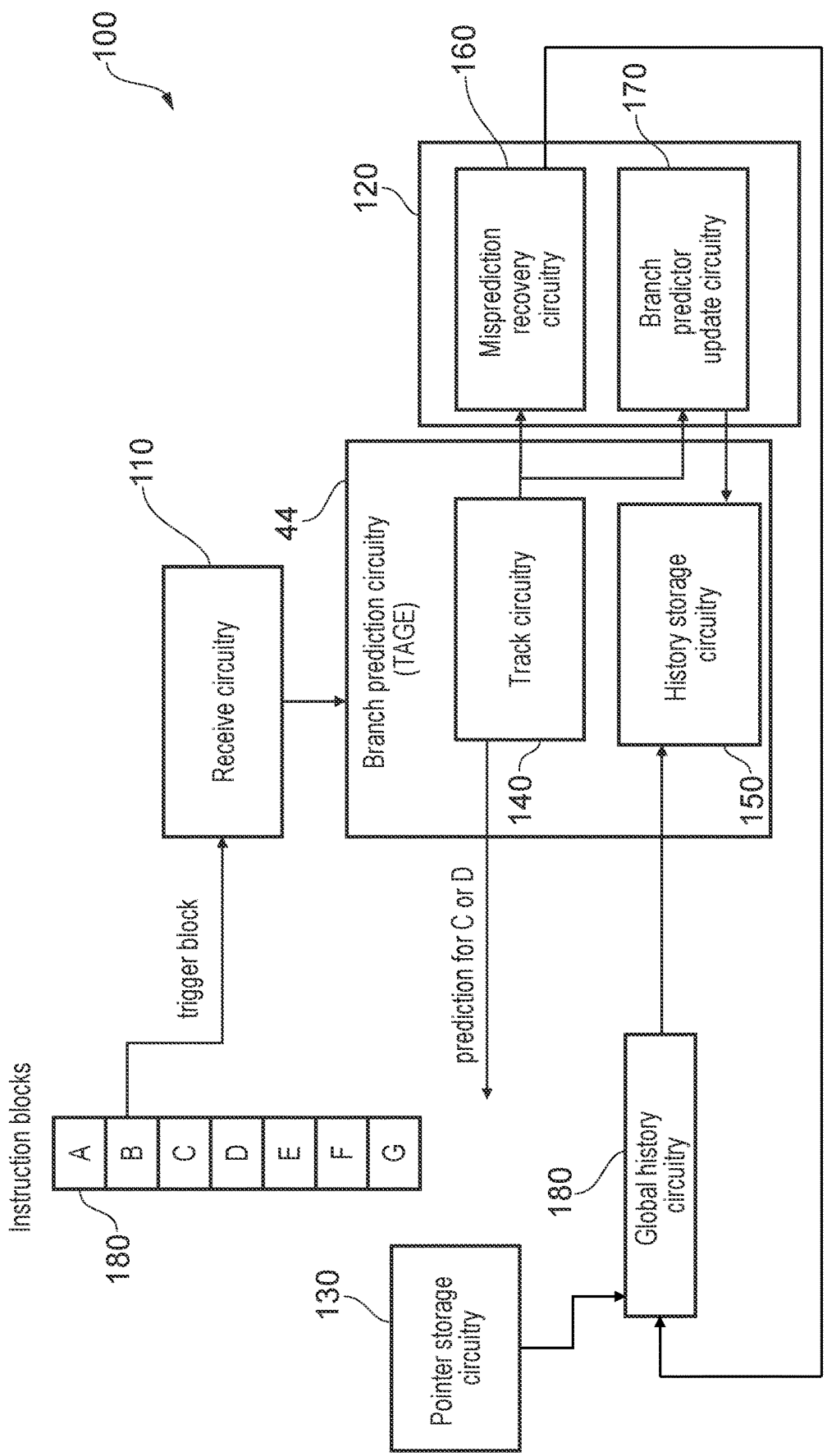
FIG. 2 schematically shows an example of the apparatus in accordance with the present technique.

FIG. 2 shows an example of the apparatus 100 in accordance with the present technique. In this example, predictions are made by the branch direction predictor 44 (which is an example of branch prediction circuitry) for blocks of instructions 180 for which it has already been predicted that a branch will be taken. Each of the blocks 180 therefore has been predicted to have a taken branch. The letter associated with each block (A, B, C, etc.) refers to an address of the first instruction in that block. The blocks are received (in this example) in alphabetical order. In this example, the apparatus 100 includes receive circuitry 110 that receives a notification of a trigger block (instruction block B in this example). The notification could be a notification that a prediction for the trigger block B has reached certain pipeline stage (P1). The notification received by the receive circuitry 110 causes the branch prediction circuitry 44 to produce a prediction for subsequent instruction block C (which is an example of the apparatus operating in 1-taken mode) or for a later instruction block D (which is an example of the apparatus operating in 2-taken mode). The significance of these modes will be explained with respect to FIG. 3.

Note that the mode of operation may not be selectable and might depend on the nature of the blocks being considered.

The prediction produced by the branch prediction circuitry 44 is based on data stored in the history storage circuitry 150. In particular, such a branch predictor 44 operates on the principle that the data (e.g. targets and/or addresses) relating to recent taken branch instructions can be used as a good predictor for the outcome of future branch instructions. Therefore, global history circuitry 180 stores data relating to the outcomes of recent branches and this data is stored in association with the outcome of a branch instruction and stored in the global history storage circuitry 150. The global history storage circuitry 150 can then be queried against the global history circuitry 180 to produce a prediction for a next branch instruction. In practice, the global history circuitry 180 contains a number of entries, with each recent branch instruction being stored as a separate entry within the global history circuitry 180. A new entry is created each time a new branch instruction is encountered. Pointer storage circuitry 130 is provided in order to identify the most recent entry that has been added to the global history circuitry 180. The most recent N entries may be combined together and compared to the history storage circuitry 150. This process will be illustrated in more detail below.

However, the global history storage circuitry 150 can end up being very large and it may not be possible to produce an immediate prediction. This can be resolved by 'ahead pipelining' where one block of instructions is used to trigger the generation of a prediction for a later block of instructions. For instance, in 1-taken the prediction for block C is triggered by (e.g.) block B and is queried using global history data that is available when the trigger block B is encountered. In 2-taken, the prediction for block C is triggered by and queried using the global history data available by trigger block A.

The combination of this ahead-pipelining and 1-taken/2-taken predictions can lead to problems when it comes to misprediction. A misprediction occurs when the predicted outcome for a block of instructions (e.g. C) differs from the actual outcome. Typically, in response to a misprediction, it is necessary to update both the actual global history circuitry 180 to reflect the actual series of branches taken, and also to update the history storage circuitry 150 to reflect how the global history relates to the actual outcome of the branch in block C. However, since the predictions are made based on the history that was available at the time of encountering a different block (the trigger block) it is necessary to know what that trigger block is, and this differs depending on whether 1-taken or 2-taken was used (or indeed, any N-taken).

The track circuitry 140 is used to determine which entries of the global history circuitry 180 need updating. As will be clear from the above, this will depend on whether the trigger block was the previous block (in 1-taken mode) or the previous previous block (in 2-taken mode). Branch predictor update circuitry 170 is then responsible for updating the history storage circuitry 150 and the misprediction recovery circuitry 160 is responsible for updating the current value of the global history circuitry 180.

Figure 3:
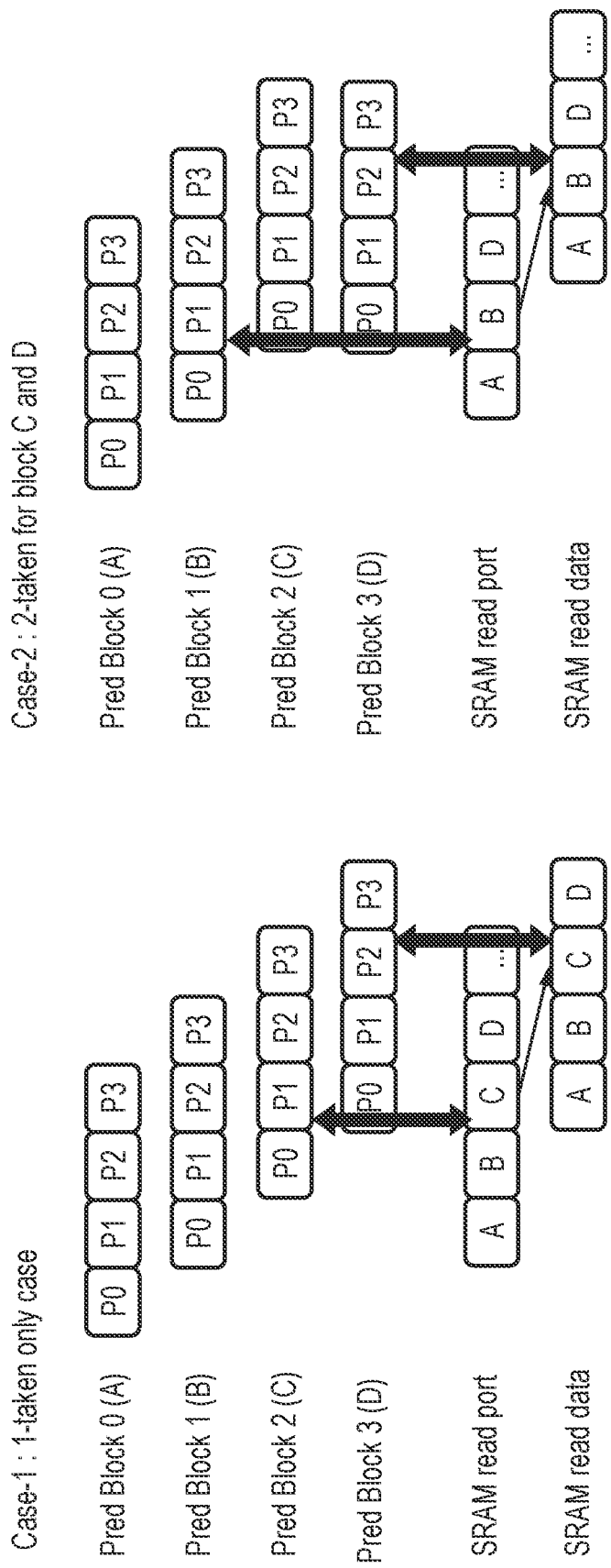
FIG. 3 illustrates the two modes of operation to which prediction can occur in the apparatus.

FIG. 3 illustrates the two modes of operation to which prediction can occur in the apparatus 100 (and particularly the branch prediction circuitry 44) and the different branch prediction pipeline stages (P0-P3) through which each prediction occurs.

In the P0 stage, a next predicting address is selected from the previous P1/P2/P3 stages. For instance, if the P2 stage for the previous block found a new taken branch, then the branch target in the P2 stage will be selected.

In the P1 stage, access for the predictor array will occur (BTB), or access for the predictor array will be set up (TAGE) for a next block of instructions.

In the P2 stage, an early prediction (e.g. the branch direction for each branch) is obtained from the predictor array for the next block of instructions.

In the P3 stage, the branch prediction is finalised for the next block of instructions. Here, the branch prediction might be adjusted once all branch prediction has become available. If the branch prediction changes as compared to the P1/P2 stage, then the branch predictor pipeline is flushed because blocks of instructions will have been fetched on the basis of previous predictions that are subsequently deemed to be inaccurate. Prediction then resumes from the corrected location.

We now explain the nature of 1-taken and 2-taken modes of operation.

The first mode of operation is 1-taken. This occurs when a trigger block causes exactly one other block to be considered by the prediction circuitry 44, resulting in a prediction for that block. The trigger block is used as the SRAM read port and usage of the trigger block occurs during the pipeline stage P1. For instance, block B is used as the trigger block in a third cycle in the 1-taken example of FIG. 3 for the prediction of a block C. Having triggered the prediction to be produced for block C, the actual prediction becomes available two cycles later (in cycle five) at the SRAM read data port in the pipeline stage P2. In practice, the prediction might become available part way through that cycle rather than at the end of it and therefore the prediction might take more than one cycle but also less than two full cycles.

The second mode of operation is 2-taken. This occurs when a trigger block causes two blocks to be considered by the prediction circuitry 44 within one processor cycle. The trigger block is again used as the SRAM read port and usage of the trigger block again occurs during the pipeline stage P1. For instance, block B is used as the trigger block in a third cycle of the 2-taken example of FIG. 3 for blocks C and D. This situation arises because the branch predictor quickly determines that the prediction for block C is highly biased (e.g. all branches in the block are almost always not-taken or almost always taken such as if the block contains no conditional branches and one unconditional direct branch). A slower predictor such as a TAGE predictor therefore need not be activated for this block because the overall outcome (taken or not taken) is strongly predicted and so a prediction for another block (block D in this case) can immediately start. Having triggered the prediction to be produced for block D, the actual prediction becomes available two cycles later (in cycle five) at the SRAM read data port in the pipeline stage P2. In practice, the prediction might become available part way through that cycle rather than at the end of it and therefore the prediction might take more than one cycle but also less than two full cycles.

More generally, it is possible for more than just 1-taken and 2-taken to be supported. For instance, 3-taken refers to a situation in which two blocks of instructions are considered by the prediction circuitry and it is concluded that both blocks of instructions are unconditional (or approximately unconditional) and that a prediction for a next block of instructions is produced. Other modes are of course also applicable and the term N-taken is used to refer to the idea of processing multiple blocks in the same processor cycle in this manner It will be appreciated that in the 2-taken case, the triggering block for the prediction of block D is not the previous block but the previous previous block (block B). As previously explained, when it becomes necessary to make corrections due to mispredictions at the misprediction recovery circuitry 160 and the branch predictor update circuitry 170, it is therefore necessary to know whether the prediction occurred during the 1-taken mode (in which case the triggering block is the previous block) or the 2-taken mode (in which case the triggering block is the previous previous block).

Figure 4:
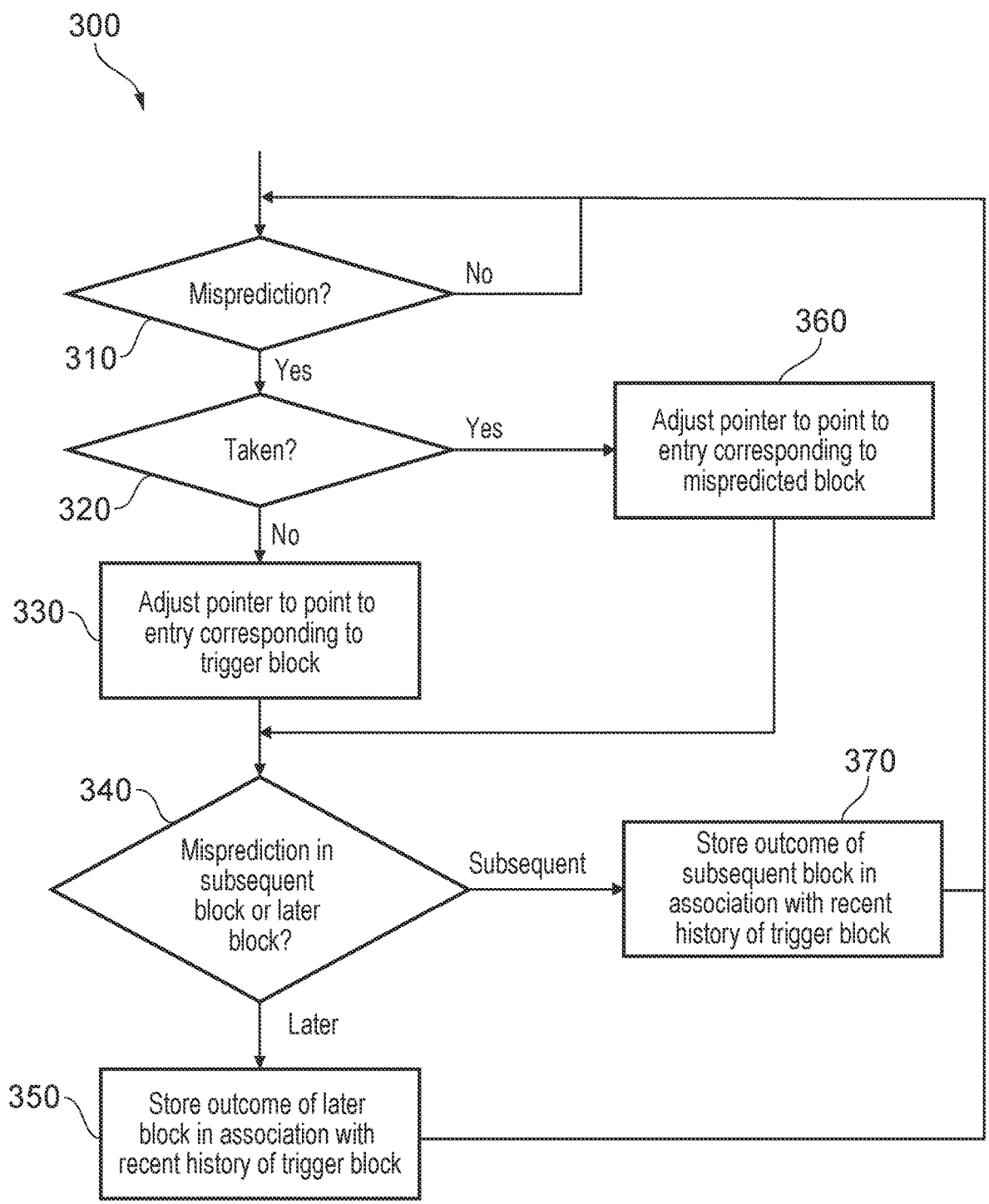
FIG. 4 illustrates a flow chart that shows a process of performing updates in response to mispredictions.

FIG. 4 illustrates a flow chart 300 that shows a process of performing updates in response to mispredictions. The updates are variously performed by the misprediction recovery circuitry 160 and the branch predictor update circuitry 170. At a step 310, it is determined whether a misprediction has occurred. A misprediction can be detected one a branch instruction (or other control flow instruction) in a block of instructions has been executed and the result of the execution can be compared to the prediction that was generated (e.g. during a fetch stage of the pipeline). If no misprediction has occurred then the process loops back around to step 310. In other words, the process waits until a misprediction occurs before proceeding to step 320.

At a step 320, it is determined whether the actual outcome of the branch instruction was that the branch was taken or not. If the branch was taken then at step 360 the pointer stored in the pointer storage circuitry 130 is changed by the misprediction recovery circuitry 160 to point to an entry of the global history circuitry 180 that corresponds to the mispredicted block. This entry will contain data (e.g. branch target and address) relating to the mispredicted block, which of course will now be updated with the correct data. The pointer is updated to this position to represent the most recent branch taken decision prior to the misprediction occurring and thereby enable the prediction pipeline to be restarted. The process then proceeds to step 340.

If the actual outcome was that the branch was not taken, then further rewinding of the pointer 130 is needed. This is because the branch prediction circuitry 44 bases its decisions on recent taken branches. Consequently, at step 330, the pointer is adjusted by the misprediction recovery circuitry 160 to point to an entry of the global history circuitry 180 that corresponds to (e.g. represents the latest branch history that was available at a time of encountering) the trigger block. This might be the block immediately preceding the mispredicted block (in the case of 1-taken) or immediately preceding the immediately preceding block (in the case of 2-taken), and so on. The pointer is therefore rewound to point to an earlier version of the global history that corresponds to the trigger block. The process then proceeds to step 340. Note that as a consequence of steps 320, 330, and 340, the pointer is made to point to the most recent block in which a branch was taken. That block is either the mispredicted block if the mispredicted block is deemed taken or the previous (trigger) block if the mispredicted block is not taken. The trigger block itself was considered to be taken since the branch history is updated on taken branches.

At step 340, it is determined whether the misprediction was made in respect of a subsequent block of instructions or a later block of instructions (i.e. whether the prediction was made in 1-taken or 2-taken mode). This can be determined using the track circuitry 140, as will be explained in the following figures.

If the misprediction occurred in respect of a subsequent block of instructions, (i.e. 1-taken) then at step 370 the outcome of the subsequent block of instructions is stored by the branch predictor update circuitry 170 together with the N most recent entries that were 'current' in the global history circuitry 180 when the trigger block (the block of instructions immediately preceding the mispredicted block) was encountered. The process then returns to step 310.

If the misprediction occurred in respect of a later block of instructions (i.e. 2-taken), then at step 350 the outcome of the later block of instructions is stored by the branch predictor update circuitry 170 in relation to the trigger block—which is to say the N most recent entries that were 'current' in the global history circuitry 180 at a time that the block of instructions immediately preceding the block that immediately precedes the mispredicted block was encountered is stored together with the (now known) outcome of the later block of instructions. The process then returns to step 310.

Clearly this process can be extended to other values of N-taken (N>2) by tracking which block of instructions is acting as the trigger block for the mispredicted block, and therefore should have its associated data updated.

Merely by example, and considering the 2-taken situation in FIG. 3, if a misprediction occurs with respect to prediction block D and that the actual outcome of block D is that the block was not taken, then the global history circuitry is rewound by updating the pointer in the pointer storage circuitry 130. In particular, the pointer will be updated to point to a value corresponding or associated with the trigger block B (i.e. the latest branch history that was available when the trigger block was encountered).

Note that throughout the process of FIG. 4, multiple different branch histories may be simultaneously gathered and prepared before it is known which will be required. For instance, consider the situation with a prediction block D that is mispredicted. At steps 340, 350, and 370, the recent history at block C (step 370) or block B (step 350) is used. Furthermore, block D will act as a trigger block for a next block E for which a prediction is to be made (on the assumption that the prediction made for block D was correct), and therefore the recent history at block D (e.g. the branch address and/or target address for D, C, B, and A) is used. Each of these three recent histories can be prepared simultaneously (e.g. before it is known which will be used).

Figure 5A:
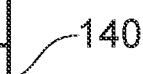
FIG. 5A illustrates an example of the track circuitry in accordance with some examples.

FIG. 5A illustrates an example of the track circuitry 140 in accordance with some examples. In these examples, once a prediction is issued for a particular block by the branch prediction circuitry 44, the fact is stored in the track circuitry 140 together with an indication of whether the prediction for that block was 1-taken or 2-taken. Here a single bit is used, which is encoded as a '1' if 1-taken was used (only a prediction for a single block was made) and a '0' otherwise (e.g. if 2-taken was used).

Figure 5B:
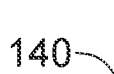
FIG. 5B illustrates an example of the track circuitry in accordance with some other examples.

FIG. 5B illustrates a variant of the track circuitry 140 in accordance with some examples. In these examples, the track circuitry stores the mode of the branch prediction circuitry 44. For instance, in the case of 1-taken, the number stored is '1'. In the case of 2-taken, the number stored is '2', and in the case of 3-taken, the number stored is 3. This makes it possible to store more different modes of operation beyond simply 1-taken and 2-taken.

Figure 6:
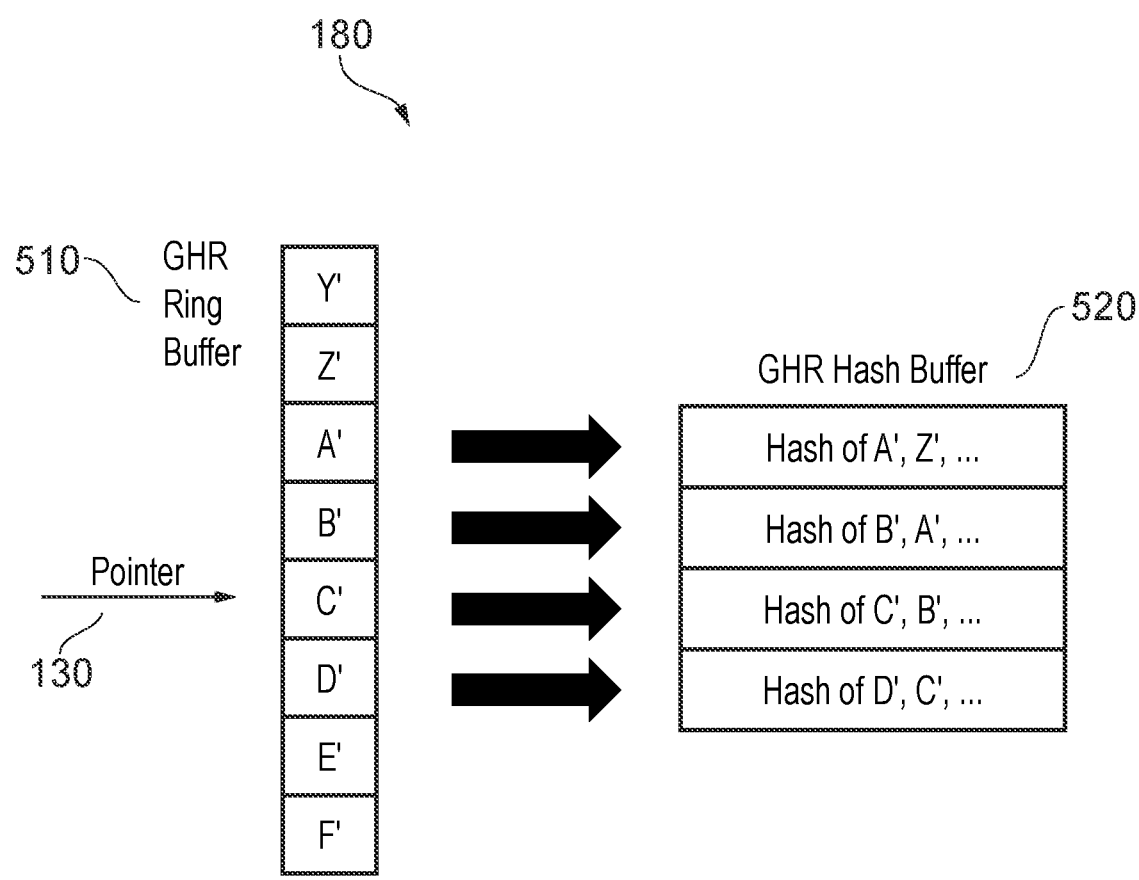
FIG. 6 illustrates the global history circuitry in more detail.

FIG. 6 illustrates the global history circuitry 180 in more detail. The global history circuitry 180 includes a global history ring buffer 510 that includes a number of entries Y', Z', A', . . . , F'. Here, the term X' refers to data relating to the exit point of a branch X. That is, data (e.g. branch address and/or branch target) relating to the predicted taken branch instruction in the predicted taken block X. Note that different data for each block might be stored. For instance, a most recent block might only store a program counter value of the predicted taken branch instruction since the predicted target of that branch instruction might not yet be known. Of course, such data might be expected to be updated when it becomes available. A ring buffer is a special type of buffer in which the ends are virtually connected. This means that it is not necessary to move elements around each time an entry is deleted. Instead, the pointers used to navigate the buffer can simply be changed. Furthermore, a ring buffer is a practical structure for providing a window of entries, e.g. the most recent 8 entries (in this example).

Each entry within the ring buffer stores data relating to the taken branch of a recent branch instruction in the associated block. For instance, the entry B' stores data (e.g. the branch address and/or the branch target address and/or other information) relating to the branch taken in block B. The most recent N entries can be combined together to produce a query to the history storage circuitry 150. Note that the data stored for each entry may change during the prediction pipeline. That is, the branch address might be stored during one part of the prediction pipeline and later on in the pipeline, a branch target address might be added.

At step 330 or step 360 when the pointer is adjusted, it is moved back to an earlier entry. For instance, in FIG. 6 the pointer is pointing to entry C', which contains an outcome (or a predicted outcome) for block C. Such a prediction occurs at the prediction pipeline stage P2. Block D is therefore in stage P1, which has acted as a trigger for a block E and (in 2-taken mode) also for a block F. If a misprediction occurred for block E or (in 2-taken mode) for block F and if the mispredicted block was actually taken then the pointer would be adjusted to point back to the mispredicted block (E or F). If the block was actually not taken then the pointer is moved further back to the trigger block (D) because the history only concerns taken blocks. By moving the pointer back, it is rewound to refer to a value that it would have at a time that a prediction was correctly made for the mispredicted block. The size of the ring buffer is equal to the number of entries used to perform predictions, plus the maximum number of inflight predicted taken branches.

Also shown in FIG. 6 is a set of hashes for each of the entries. A global history based predictor uses hashes to combine the individual entries of the global history circuitry 180 that are stored. However, it would be computationally expensive to recalculate the hashes each time the pointer was adjusted. In order to prevent this, a set of hash values 520 are stored—each corresponding to one of the entries of the ring buffer 510—i.e. each storing a hash of N entries of the global history circuitry 180 culminating in the most recent entry. Consequently, when the pointer is adjusted, the corresponding hash value is already known and can be used without having to be recalculated. The number of entries in this set of hash values 520 is equal to the maximum number of predicted taken branches that can be inflight simultaneously, plus one.

Figure 7:
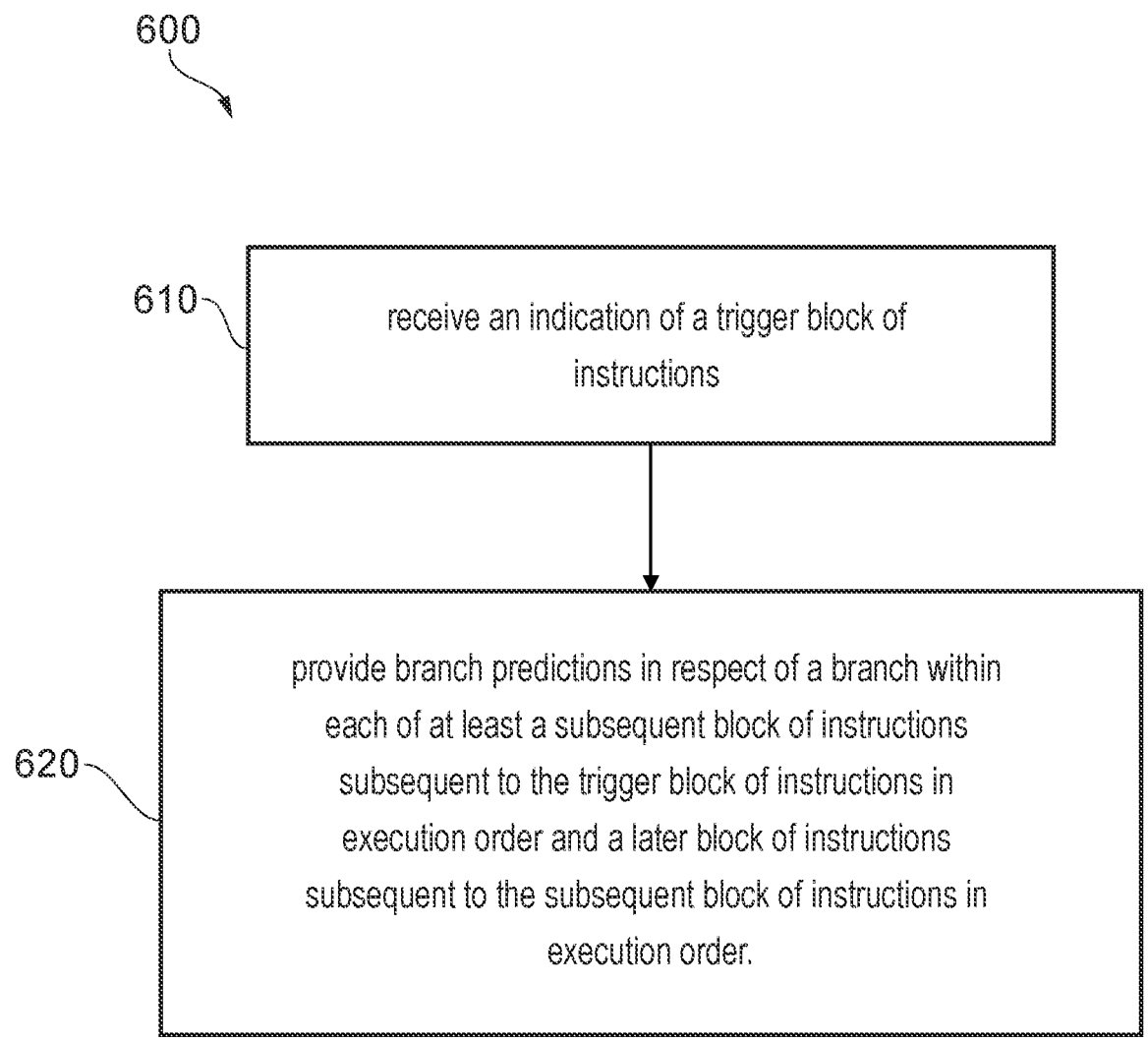
FIG. 7 illustrates a flowchart in accordance with some embodiments.

FIG. 7 illustrates a flowchart 600 in accordance with some embodiments. At a step 610, an indication of a trigger block of instructions is received. Then, at a step 620, branch instructions are provided in respect of a branch within a subsequent block of instructions and a later block of instructions subsequent to the subsequent block of instructions (subsequent referring to execution order).

In accordance with the above examples, it is possible to make use of a large prediction circuitry while still enabling multiply processed prediction blocks to occur (e.g. in the case of 2-taken or N-taken).

Note that the above examples consider recent taken branch history. It is of course possible to utilise the above techniques with all recent branch history. In this case, the decision block at step 320 becomes irrelevant—the process flows from step 310 to step 360, to step 340.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The application could be configured in accordance with the following clauses:

1. A data processing apparatus comprising:
    receive circuitry configured to receive an indication of a trigger block of instructions; and
    branch prediction circuitry configured to provide, in response to the trigger block of instructions, branch predictions in respect of a branch within:
        a subsequent block of instructions subsequent to the trigger block of instructions in execution order, when in a 1-taken mode of operation; and
        a later block of instructions subsequent to the subsequent block of instructions in execution order, when in a 2-taken mode of operation.
2. The data processing apparatus according to clause 1, wherein
    the branch prediction circuitry is a global-history based branch predictor; and
    the branch prediction circuitry is configured to return a prediction for a given block of instructions more than one processor cycle after receiving a request for the prediction.
3. The data processing apparatus according to any preceding clause, wherein
    the branch prediction circuitry is a TAGE predictor.
4. The data processing apparatus according to any preceding clause, wherein
    the branch prediction circuitry is configured to return a prediction for a given block of instructions based on a branch history of a number of contiguous blocks of instructions prior to the given block of instructions.
5. The data processing apparatus according to any preceding clause, wherein
    the branch prediction circuitry is configured to return a prediction for a given block of instructions based on a branch history of a number of contiguous blocks of instructions prior to the trigger block of instructions.
6. The data processing apparatus according to any preceding clause, wherein
    the branch prediction circuitry is configured to return a prediction for a given block of instructions based on a branch history of a number of contiguous blocks of instructions prior to the trigger block of instructions as well as a program counter value associated with the trigger block of instructions.
7. The data processing apparatus according to any preceding clause, comprising:
    track circuitry configured to track, for each predicted block of instructions for which a prediction is produced by the branch prediction circuitry, whether the prediction was produced in the 1-taken mode of operation or the 2-taken mode of operation.
8. The data processing apparatus according to any preceding clause, comprising:
    track circuitry configured to track, for each predicted block of instructions for which a prediction is produced by the branch prediction circuitry, which of the modes of operation the prediction was produced in, wherein the modes of operation include the 1-taken mode of operation and the 2-taken mode of operation.
9. The data processing apparatus according to any one of clauses 7-8, comprising:
    pointer storage configured to store a pointer to one of a plurality of entries of global history storage circuitry to indicate a history to be used in a next prediction, wherein each of the entries relate to outcomes of a plurality of blocks of instructions; and misprediction recovery circuitry configured, in response to a misprediction of the subsequent block of instructions or the later block of instructions, to update the pointer.

10. The data processing apparatus according to clause 9, wherein in response to a misprediction of the subsequent block of instructions when the subsequent block of instructions is taken, the misprediction recovery circuitry adjusts the pointer to point to one of the entries of the global history storage circuitry corresponding to the subsequent block of instructions; and in response to a misprediction of the later block of instructions when the subsequent block of instructions is taken, the misprediction recovery circuitry adjusts the pointer to point to one of the entries of the global history storage circuitry corresponding to the later block of instructions.

11. The data processing apparatus according to any one of clauses 9-10, wherein in response to a misprediction of the subsequent block of instructions when the subsequent block of instructions is not taken, the misprediction recovery circuitry adjusts the pointer to point to one of the entries of the global history storage circuitry corresponding to the trigger block of instructions.

12. The data processing apparatus according to any one of clauses 9-11, wherein in response to a misprediction of the later block of instructions when the later block of instructions is not taken, the misprediction recover circuitry adjusts the pointer to point to one of the entries to the global history storage circuitry corresponding to the trigger block of instructions.

13. The data processing apparatus according to any one of clauses 9-12 comprising:

branch predictor update circuitry configured, in response to a misprediction of the subsequent block of instructions, to store an outcome of the subsequent block of instructions in association with the trigger block of instructions.

14. The data processing apparatus according to any one of clauses 9-13 comprising:

branch predictor update circuitry configured, in response to a misprediction of the later block of instructions, to store an outcome of the later block of instructions in association with the trigger block of instructions.

15. The data processing apparatus according to any one of clauses 9-14 comprising:

hash storage circuitry configured to store, for at least some of the entries, a hash based on the outcomes of a plurality of blocks of instructions.

16. A data processing method comprising:

receiving an indication of a trigger block of instructions; and providing, in response to the trigger block of instructions, branch predictions in respect of a branch within:
  a subsequent block of instructions subsequent to the trigger block of instructions in execution order, when in a 1-taken mode of operation; and
  a later block of instructions subsequent to the subsequent block of instructions in execution order, when in a 2-taken mode of operation.

17. A non-transitory computer-readable medium to store computer-readable code for fabrication of a data processing apparatus comprising:

receive circuitry configured to receive an indication of a trigger block of instructions; and branch prediction circuitry configured to provide, in response to the trigger block of instructions, branch predictions in respect of a branch within:
  a subsequent block of instructions subsequent to the trigger block of instructions in execution order, when in a 1-taken mode of operation; and
  a later block of instructions subsequent to the subsequent block of instructions in execution order, when in a 2-taken mode of operation.

We claim:

1. A data processing apparatus comprising:

receive circuitry configured to receive an indication of a trigger block of instructions; and branch prediction circuitry configured to provide, in response to the trigger block of instructions, branch predictions in respect of a branch within:
  a subsequent block of instructions subsequent to the trigger block of instructions in execution order, when in a 1-taken mode of operation; and
  a later block of instructions subsequent to the subsequent block of instructions in execution order, when in a 2-taken mode of operation.

2. The data processing apparatus according to claim 1, wherein the branch prediction circuitry is a global-history based branch predictor; and the branch prediction circuitry is configured to return a prediction for a given block of instructions more than one processor cycle after receiving a request for the prediction.

3. The data processing apparatus according to claim 1, wherein the branch prediction circuitry is a TAGE predictor.

4. The data processing apparatus according to claim 1, wherein the branch prediction circuitry is configured to return a prediction for a given block of instructions based on a branch history of a number of contiguous blocks of instructions prior to the given block of instructions.

5. The data processing apparatus according to claim 1, wherein the branch prediction circuitry is configured to return a prediction for a given block of instructions based on a branch history of a number of contiguous blocks of instructions prior to the trigger block of instructions.

6. The data processing apparatus according to claim 1, wherein the branch prediction circuitry is configured to return a prediction for a given block of instructions based on a branch history of a number of contiguous blocks of instructions prior to the trigger block of instructions as well as a program counter value associated with the trigger block of instructions.

7. The data processing apparatus according to claim 1, comprising:

track circuitry configured to track, for each predicted block of instructions for which a prediction is produced by the branch prediction circuitry, whether the prediction was produced in the 1-taken mode of operation or the 2-taken mode of operation.

8. The data processing apparatus according to claim 1, comprising:

track circuitry configured to track, for each predicted block of instructions for which a prediction is produced by the branch prediction circuitry, which of the modes of operation the prediction was produced in, wherein the modes of operation include the 1-taken mode of operation and the 2-taken mode of operation.

9. The data processing apparatus according to claim 7, comprising:
pointer storage configured to store a pointer to one of a plurality of entries of global history storage circuitry to indicate a history to be used in a next prediction, wherein each of the entries relate to outcomes of a plurality of blocks of instructions; and
misprediction recovery circuitry configured, in response to a misprediction of the subsequent block of instructions or the later block of instructions, to update the pointer.

10. The data processing apparatus according to claim 9, wherein
in response to a misprediction of the subsequent block of instructions when the subsequent block of instructions is taken, the misprediction recovery circuitry adjusts the pointer to point to one of the entries of the global history storage circuitry corresponding to the subsequent block of instructions; and
in response to a misprediction of the later block of instructions when the subsequent block of instructions is taken, the misprediction recovery circuitry adjusts the pointer to point to one of the entries of the global history storage circuitry corresponding to the later block of instructions.

11. The data processing apparatus according to claim 9, wherein
in response to a misprediction of the subsequent block of instructions when the subsequent block of instructions is not taken, the misprediction recovery circuitry adjusts the pointer to point to one of the entries of the global history storage circuitry corresponding to the trigger block of instructions.

12. The data processing apparatus according to claim 9, wherein
in response to a misprediction of the later block of instructions when the later block of instructions is not taken, the misprediction recover circuitry adjusts the pointer to point to one of the entries to the global history storage circuitry corresponding to the trigger block of instructions.

13. The data processing apparatus according to claim 9 comprising:
branch predictor update circuitry configured, in response to a misprediction of the subsequent block of instructions, to store an outcome of the subsequent block of instructions in association with the trigger block of instructions.

14. The data processing apparatus according to claim 9 comprising:
branch predictor update circuitry configured, in response to a misprediction of the later block of instructions, to store an outcome of the later block of instructions in association with the trigger block of instructions.

15. The data processing apparatus according to claim 9 comprising:
hash storage circuitry configured to store, for at least some of the entries, a hash based on the outcomes of a plurality of blocks of instructions.

16. A data processing method comprising:
receiving an indication of a trigger block of instructions; and
providing, in response to the trigger block of instructions, branch predictions in respect of a branch within:
a subsequent block of instructions subsequent to the trigger block of instructions in execution order, when in a 1-taken mode of operation; and
a later block of instructions subsequent to the subsequent block of instructions in execution order, when in a 2-taken mode of operation.

17. A non-transitory computer-readable medium to store computer-readable code for fabrication of a data processing apparatus comprising:
receive circuitry configured to receive an indication of a trigger block of instructions; and
branch prediction circuitry configured to provide, in response to the trigger block of instructions, branch predictions in respect of a branch within:
a subsequent block of instructions subsequent to the trigger block of instructions in execution order, when in a 1-taken mode of operation; and
a later block of instructions subsequent to the subsequent block of instructions in execution order, when in a 2-taken mode of operation.

* * * * *